United States Patent
Aubin-Marchand

(10) Patent No.: US 12,509,170 B2
(45) Date of Patent: Dec. 30, 2025

(54) SUPPORT STRUCTURE, TRACK SYSTEM HAVING A SUPPORT STRUCTURE, GUIDE RAIL AND TRACK SYSTEM HAVING A SUPPORT STRUCTURE AND A GUIDE RAIL

(71) Applicant: SOUCY INTERNATIONAL INC., Drummondville (CA)

(72) Inventor: Jeremie Aubin-Marchand, St-Hugues (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 703 days.

(21) Appl. No.: 17/893,553

(22) Filed: Aug. 23, 2022

(65) Prior Publication Data

US 2023/0069424 A1  Mar. 2, 2023

Related U.S. Application Data

(60) Provisional application No. 63/237,276, filed on Aug. 26, 2021.

(51) Int. Cl.
*B62D 55/14* (2006.01)
*B62D 55/24* (2006.01)

(52) U.S. Cl.
CPC ............. *B62D 55/14* (2013.01); *B62D 55/24* (2013.01)

(58) Field of Classification Search
CPC ................................. B62D 55/14; B62D 55/24
USPC ........................................................ 180/9.1
See application file for complete search history.

(56) References Cited

U.S. PATENT DOCUMENTS

| | | | |
|---|---|---|---|
| 2013/0072333 A1* | 3/2013 | Kuwayama | B62M 9/1348 474/82 |
| 2018/0229783 A1* | 8/2018 | Marchildon | B62D 55/24 |
| 2019/0202508 A1* | 7/2019 | Sauvageau | B62D 55/084 |
| 2020/0122796 A1* | 4/2020 | Sauvageau | B62D 55/24 |

* cited by examiner

*Primary Examiner* — Alentin Neacsu
*Assistant Examiner* — Mohamed M Medani
(74) *Attorney, Agent, or Firm* — BCF LLP

(57) ABSTRACT

A support structure, which includes an axle assembly, first and second biasing components and first and second connectors, configured to connect support wheel assemblies to a frame of a track system is disclosed. The first and second connectors and the first and second biasing components are configured to pivotally connect the axle assembly, which includes an axle and a longitudinal member, to the frame. The first and second biasing components bias the axle assembly toward a first configuration. The first biasing component is in contact with a first end portion of the longitudinal member, and the second biasing component is in contact with a second end portion of the longitudinal member. The first and second connectors are removably connectable to the frame and are respectively connected to the first and second biasing components. Support structures, guide rails and track systems having guide rails are also disclosed.

15 Claims, 12 Drawing Sheets

SUPPORT STRUCTURE, TRACK SYSTEM HAVING A SUPPORT STRUCTURE, GUIDE RAIL AND TRACK SYSTEM HAVING A SUPPORT STRUCTURE AND A GUIDE RAIL

CROSS-REFERENCE TO RELATED APPLICATION

The present application claims priority to United States Provisional Patent Application No. 63/237,276, filed Aug. 26, 2021 entitled "Support Structure, Track System Having A Support Structure, Guide Rail And Track System Having A Support Structure And A Guide Rail", which is incorporated by reference in its entirety.

TECHNICAL FIELD

The present technology relates to support structures for track systems, guided rails for track systems, and track systems.

BACKGROUND

Certain vehicles, such as, for example, agricultural vehicles (e.g., harvesters, combines, tractors, etc.) and construction vehicles (e.g., bulldozers, front-end loaders, etc.) are used on ground surfaces that are soft, slippery and/or uneven (e.g., soil, mud, sand, ice, snow, etc.).

Conventionally, such vehicles have had large wheels with tires on them to move the vehicle along the ground surface. Under certain conditions, such tires may have poor traction on some kinds of ground surfaces and, as these vehicles are generally heavy, the tires may compact the ground surface in an undesirable way owing to the weight of the vehicle.

In order to reduce the aforementioned drawbacks, to increase traction and to distribute the weight of the vehicle over a larger area on the ground surface, track systems were developed to be used in place of at least some of the wheels and tires on the vehicles. For example, under certain conditions, track systems enable construction vehicles to be used in wet field conditions as opposed to its wheeled counterpart.

Conventional track systems do, however, present some inconveniences. Endless tracks can "de-track" from their track system. Furthermore, as track systems overcome obstacles, their endless tracks can deform to, at least to some extent, conform to said obstacles. This can result in excessive deformation of said endless tracks, and thus reduce life thereof. In addition, some track systems have support wheel assemblies that can pivot to conform to obstacles. In such track systems, the wheel assemblies can be subject to excessive wear by interfering with lugs present on the endless tracks.

Therefore, there is a desire for a track system and wheel assemblies that could mitigate at least some of the above-mentioned issues.

SUMMARY

It is an object of the present technology to ameliorate at least some of the inconveniences present in the prior art.

According to one aspect of the present technology, there is provided a support structure for connecting support wheel assemblies to a frame of a track system that defines a longitudinal direction, The support structure includes an axle assembly, first and second biasing components and first and second connectors. The axle assembly includes an axle and a longitudinal member connected to the axle. The longitudinal member has a first end portion and a second end portion. The first biasing component is in contact with the first end portion of the longitudinal member. The second biasing component is in contact with the second end portion of the longitudinal member. The first connector is connected to the first biasing component and removably connectable to the frame. The second connector is connected to the second biasing component and removably connectable to the frame. The first and second connectors and the first and second biasing components are configured to pivotally connect the axle assembly to the frame. The first and second biasing components bias the axle assembly toward a first configuration.

In some embodiments, the first and second connectors extend laterally relative to the longitudinal member, and are substantially perpendicular to the longitudinal direction.

In some embodiments, each one of the first and second connectors is vertically spaced from the axle in the first configuration.

In some embodiments, when the axle assembly is in the first configuration, each one of the first and second connectors is vertically below the axle.

In some embodiments, the first biasing component surrounds the first connector and the second biasing component surrounds the second connector.

In some embodiments, the axle assembly pivots about a longitudinal pivot axis.

In some embodiments, the longitudinal pivot axis is vertically spaced from the axle.

In some embodiments, when the axle assembly is in the first configuration, the longitudinal pivot axis is below the axle.

In some embodiments, the first and second connectors extend vertically relative to the longitudinal member, and are substantially perpendicular to the longitudinal direction.

The first biasing components includes a first biasing portion in contact with a first side of the longitudinal member at the first end portion, and a second biasing portion in contact with a second side of the longitudinal member at the first end portion. The second biasing component includes a third biasing portion in contact with the first side of the longitudinal member at the second end portion, and a fourth biasing portion in contact with the second side of the longitudinal member at the second end portion.

In some embodiments, the axle pivots about a longitudinal pivot axis.

In some embodiments, the longitudinal pivot axis is defined by the longitudinal member.

In some embodiments, at least two support wheel assemblies are rotationally connected to the axle.

In some embodiments, at least one of the at least two support wheel assemblies is a tandem wheel assembly.

In some embodiments, the biasing component is made from a resilient material.

According to another aspect of the present technology, there is provided a track system having a frame, a sprocket wheel assembly, at least one idler wheel assembly, at least one support structure according to the above aspect or according to the above aspect and one or more of the above embodiments, at least two support wheel assemblies and an endless track. The sprocket wheel assembly is rotationally connected to the frame. The at least one idler wheel assembly is rotationally connected to the frame. The at least one support structure is connected to the frame. The at least two support wheel assemblies are rotationally connected to the support structure. The endless track surrounds the sprocket wheel assembly, the idler wheel assembly, the at least one support structure and the at least two support wheel assemblies.

In some embodiments, the track system further includes a guide rail connected to the frame and spaced from the endless track, the guide rail extending in the longitudinal direction.

In some embodiments, the support structure includes a guide rail contacting portion, and the guide rail has a base surface in contact with the guide rail contacting portion, and in response to the support structure pivoting, the guide rail resiliently deforms to maintain contact with the guide rail contacting portion.

In some embodiments, the guide rail has a first portion having a first width and a second portion having a second width, wherein the second width is larger than the first width.

In some embodiments, the guide rail has a first lateral guide rail side and second lateral guide rail side. A first of the at least two support wheels has a first wheel side and a second wheel side, the first wheel side being adjacent to first lateral guide rail side, and a second of the at least two support wheels has a third wheel side and a fourth wheel side, the third wheel side being adjacent to the second lateral guide rail side. When the support structure is in a first configuration, a first distance is measured from the first lateral guide rail side to the first wheel side and a second distance is measured from the second lateral guide rail side to the third wheel side. In response to the support structure pivoting, the guide rail resiliently deforms to maintain the first and second distances substantially the same.

In some embodiments, when the track system is in a second configuration, the endless track has a first longitudinal set of lugs having a first lug side and a second lug side, the first lug side being adjacent to the first lateral guide rail side and the second lug side being adjacent to the first wheel side, and a second longitudinal set of lugs having a third lug side and a fourth lug side, the third lug side being adjacent to the second lateral guide rail side and the fourth lug side being adjacent to the third wheel side. When the support structure is in the first configuration, a third distance is measured from the first lateral guide rail side to the first lug side, a fourth distance is measured from the second lateral guide rail side to the third lug side, a fifth distance is measured from the second lug side to the first wheel side, and a sixth distance is measured from the fourth lug side to the third wheel side, and in response to the axle assembly pivoting, the guide rail resiliently deforms to maintain the third, fourth, fifth and sixth distances substantially the same.

In some embodiments, in response to the endless track deforming toward the guide rail, a deformation of the endless track is limited by the guide rail when an inner surface of the endless track contacts the guide rail.

According to another aspect of the present technology, there is provided a support structure for connecting support wheel assemblies to a frame of a track system that defines a longitudinal direction. The support structure includes an axle assembly and a biasing component. The axle assembly, which is pivotally connectable to the frame, includes an axle, and a longitudinal member connected to the axle. The longitudinal member has a first end portion and a second end portion. The longitudinal member defines a longitudinal pivot axis extending between the first and second end portions. The biasing component is in contact with the longitudinal member, and is configured to connect the axle assembly to the frame. The biasing component biases the axle assembly toward a first configuration.

In some embodiments, the biasing component is configured to deform by compressive loads.

In some embodiments, the biasing component includes a first biasing component and a second biasing component. The first biasing components includes a first biasing portion in contact with a first side of the longitudinal member at the first end portion, and a second biasing portion in contact with a second side of the longitudinal member at the first end portion. The second biasing component includes a third biasing portion in contact with the first side of the longitudinal member at the second end portion, and a fourth biasing portion in contact with the second side of the longitudinal member, at the second end portion.

In some embodiments, the axle assembly is pivotable about the longitudinal pivot axis by up to about fifteen degrees.

In some embodiments, the axle assembly is pivotable about the longitudinal pivot axis by up to about ten degrees.

In some embodiments, the axle assembly is pivotable about the longitudinal pivot axis by up to about five degrees.

According to another aspect of the present technology, there is provided a track system defining a longitudinal direction. The track system includes a frame, a sprocket, at least one idler wheel assembly, a guide rail, at least one support structure and an endless track. The sprocket wheel assembly is rotationally connected to the frame. The at least one idler wheel assembly is rotationally connected to the frame. The guide rail is connected to the frame and extends in the longitudinal direction. The guide rail has a first portion having a first width and a second portion having a second width, wherein the second width is larger than the first width. The at least one support structure is pivotally connected to the frame, and includes an axle, at least two support wheels connected to the axle and a longitudinal member connected to the axle. The longitudinal member has a guide rail contacting portion. The endless track surrounds the frame, the sprocket wheel assembly, the at least one idler wheel assembly, the guide rail and the at least one support structure.

In some embodiments, the guide rail further has a third portion having a third width, wherein the third width is larger than the first and second widths.

In some embodiments, the first portion of the guide rail has a first thickness, the second portion of the guide rail has a second thickness. The guide rail has a fourth portion having a fourth thickness, and at least one of the first, second and fourth thicknesses is greater than the at least one other of the first, second and fourth thicknesses.

In some embodiments, the guide rail is spaced from an inner surface of the endless track.

In some embodiments, the guide rail has a first lateral guide rail side and second lateral guide rail side. The first of the at least two support wheels has a first wheel side and a second wheel side, the first wheel side being adjacent to first lateral guide rail side. The second of the at least two support wheels has a third wheel side and a fourth wheel side, the third wheel side being adjacent to the second lateral guide rail side. When the support structure is in a first configuration, a first distance is measured from the first lateral guide rail side to the first wheel side, and a second distance is measured from the second lateral guide rail side to the third wheel side. In response to the support structure pivoting, the guide rail resiliently deforms to maintain the first and second distances substantially the same.

In some embodiments, when the track system is in a second configuration, the endless track has a first longitudinal set of lugs having a first lug side and a second lug side, the first lug side being adjacent to the first lateral guide rail side and the second lug side being adjacent to the first wheel side, and a second longitudinal set of lugs having a third lug side and a fourth lug side, the third lug side being adjacent to the second lateral guide rail side and the fourth lug side being adjacent to the third wheel side. When the support structure is in the first configuration, a third distance is measured from the first lateral guide rail side to the first lug side, a fourth distance is measured from the second lateral guide rail side to the third lug side, a fifth distance is measured from the second lug side to the first wheel side, and a sixth distance is measured from the fourth lug side to the third wheel side. In response to the support structure pivoting, the guide rail resiliently deforms to maintain the third, fourth, fifth and sixth distances substantially the same.

In some embodiments, the guide rail has a base surface, a first side portion extending perpendicularly to the base surface and a second side portion opposite to the first side extending perpendicularly to the base surface, the first and second side portions enhancing vertical and horizontal rigidity of the guide rail.

In some embodiments, in response to the endless track deforming toward the guide rail, a deformation of the endless track is limited by the guide rail when an inner surface of the endless track contacts the guide rail.

In some embodiments, the guide rail is configured to deform similarly to the endless track.

In some embodiments, the guide rail has horizontal, vertical and torsional rigidities similar to the horizontal, vertical and torsional rigidities of the endless track.

According to another aspect of the present technology, there is provided a track system defining a longitudinal direction. The track system includes a frame, a sprocket wheel assembly, at least one idler wheel assembly, a support structure, a resilient guide rail and an endless track. The sprocket wheel assembly is rotationally connected to the frame. The at least one idler wheel assembly is rotationally connected to the frame. The support structure is pivotally connected to the frame. The support structure includes an axle, at least two support wheels connected to the axle, and a longitudinal member connected to the axle, the longitudinal member having a guide rail contacting portion. The resilient guide rail extends in the longitudinal direction and is connected to the frame. The guide rail has a base surface in contact with the guide rail contacting portion of the longitudinal member. In response to the support structure pivoting, the guide rail resiliently deforms to maintain contact with the guide rail contacting portion of the longitudinal member. The endless track surrounding the frame, the sprocket wheel assembly, the at least one idler wheel assembly, the support structure and the guide rail.

In some embodiments, the guide rail has a first lateral guide rail side and second lateral guide rail side. A first of the at least two support wheels has a first wheel side and a second wheel side, the first wheel side being adjacent to first lateral guide rail side. A second of the at least two support wheels has a third wheel side and a fourth wheel side, the third wheel side being adjacent to the second lateral guide rail side. When the support structure is in a first configuration, a first distance is measured from the first lateral guide rail side to the first wheel side, and a second distance is measured from the second lateral guide rail side to the third wheel side. In response to the support structure pivoting, the guide rail resiliently deforms to maintain the first and second distances substantially the same.

In some embodiments, when the track system is in a second configuration, the endless track has a first longitudinal set of lugs having a first lug side and a second lug side, the first lug side being adjacent to the first lateral guide rail side and the second lug side being adjacent to the first wheel side, and a second longitudinal set of lugs having a third lug side and a fourth lug side, the third lug side being adjacent to the second lateral guide rail side and the fourth lug side being adjacent to the third wheel side. The first and second set of longitudinal lugs are laterally spaced. When the support structure is in the first position, a third distance is measured from the first lateral guide rail side to the first lug side, a fourth distance is measured from the second lateral guide rail side to the third lug side, a fifth distance is measured from the second lug side to the first wheel side, and a sixth distance is measured from the fourth lug side to the third wheel side. In response to the support structure pivoting, the guide rail resiliently deforms to maintain the third, fourth, fifth and sixth distances substantially the same.

In some embodiments, the guide rail further comprises a first side portion extending perpendicularly to the base surface and a second side portion opposite to the first side extending perpendicularly to the base surface, the first and second side portions enhancing vertical and horizontal rigidity of the guide rail.

According to another aspect of the present technology, there is provided a track system defining a longitudinal direction. The track system includes a frame, a sprocket, at least one idler wheel assembly, a guide rail, at least one support structure and an endless track. The sprocket wheel assembly is rotationally connected to the frame. The at least one idler wheel assembly is rotationally connected to the frame. The guide rail is connected to the frame and extends in the longitudinal direction. The guide rail has a first portion having a first thickness and a second portion having a second thickness, wherein the second thickness is greater than the first thickness. The at least one support structure pivotally connected to the frame. The at least one support structure includes an axle, at least two support wheels connected to the axle, and a longitudinal member connected to the axle, the longitudinal member having a guide rail contacting portion. The endless track surrounding the frame, the sprocket wheel assembly, the at least one idler wheel assembly, the guide rail and the at least one support structure.

In some embodiments, the guide rail has a first lateral guide rail side and second lateral guide rail side. A first of the at least two support wheels has a first wheel side and a second wheel side, the first wheel side being adjacent to first lateral guide rail side. A second of the at least two support wheels has a third wheel side and a fourth wheel side, the third wheel side being adjacent to the second lateral guide rail side. When the support structure is in a first configuration, a first distance is measured from the first lateral guide rail side to the first wheel side, and a second distance is measured from the second lateral guide rail side to the third wheel side. In response to the support structure pivoting, the guide rail resiliently deforms to maintain the first and second distances substantially the same.

In some embodiments, when the track system is in a second configuration, the endless track has a first longitudinal set of lugs having a first lug side and a second lug side, the first lug side being adjacent to the first lateral guide rail side and the second lug side being adjacent to the first wheel side, and a second longitudinal set of lugs having a third lug side and a fourth lug side, the third lug side being adjacent to the second lateral guide rail side and the fourth lug side being adjacent to the third wheel side. When the support structure is in the first configuration, a third distance is measured from the first lateral guide rail side to the first lug side, a fourth distance is measured from the second lateral guide rail side to the third lug side, a fifth distance is measured from the second lug side to the first wheel side, and a sixth distance is measured from the fourth lug side to the third wheel side. In response to the support structure pivoting, the guide rail resiliently deforms to maintain the third, fourth, fifth and sixth distances substantially the same.

In some embodiments, in response to the endless track deforming toward the guide rail, a deformation of the endless track is limited by the guide rail when an inner surface of the endless track contacts the guide rail.

In some embodiments, the guide rail includes a first portion having a first width, and a second portion having a second width, wherein the second width is larger than the first width.

In some embodiments, the guide rail is made from a resilient material.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example, "A and/or B" is to be taken as specific disclosure of each of (i) A, (ii) B and (iii) A and B, just as if each is set out individually herein.

In the context of the following description, "outwardly" or "outward" means away from a longitudinal center plane of the track system, and "inwardly" or "inward" means toward the longitudinal center plane. In addition, in the context of the following description, "longitudinally" means in a direction parallel to the longitudinal center plane of the track system in a plane parallel to flat level ground, "laterally" means in a direction perpendicular to the longitudinal center plane in a plane parallel to flat level ground, and "generally vertically" means in a direction contained in the longitudinal center plane along a height direction of the track system generally perpendicular to flat level ground. Also, the term "wheel assemblies" include all the necessary structure (bearing structures, pins, axles and other components) to permit a structure/wheel to pivot/rotate about an axis, as the case may be.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
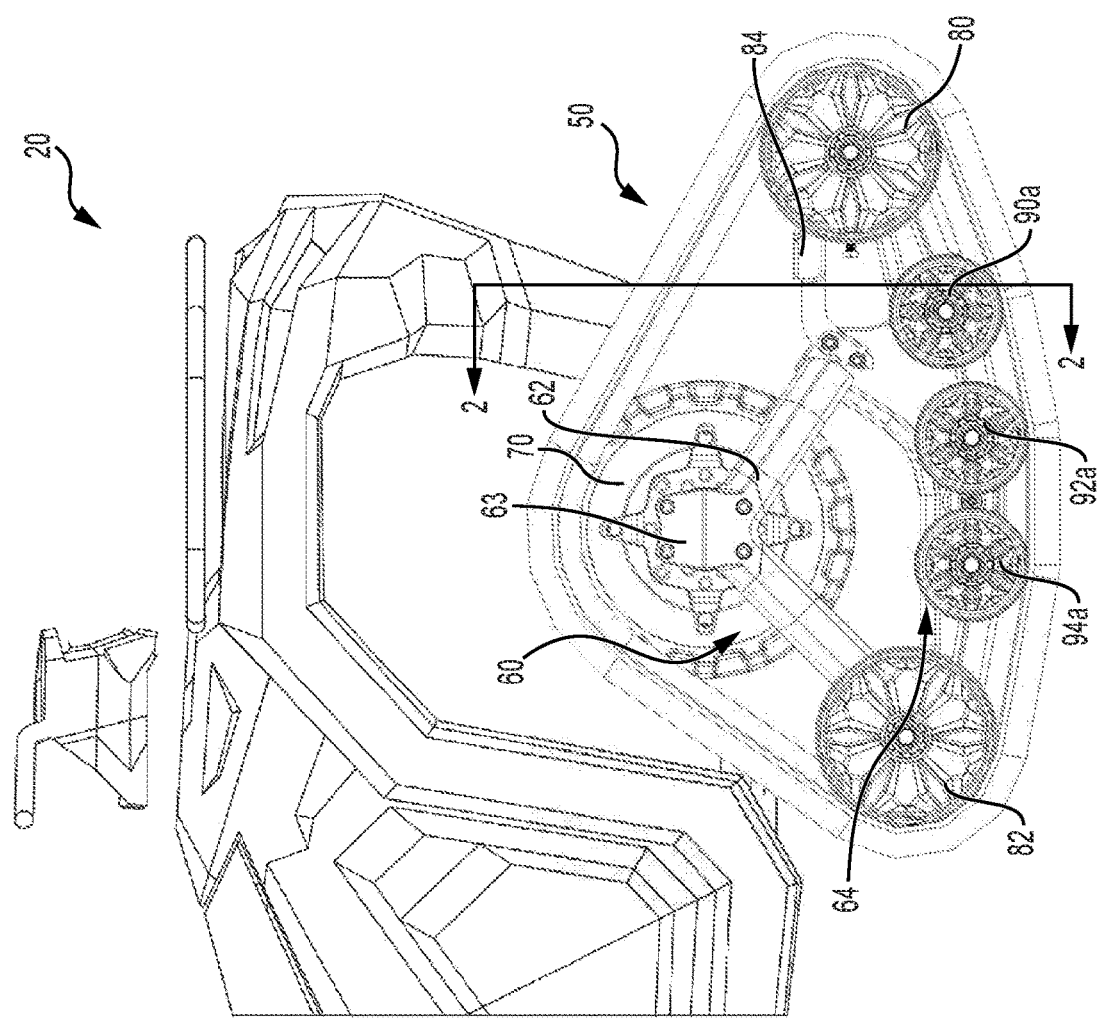
FIG. 1 is a close-up, right side elevation view of an all-terrain-vehicle equipped with a front, right track system having support structures in accordance with an embodiment of the present technology, a guide rail in accordance with an embodiment of the present technology and an endless track.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

The present technology relates support structures connected to a track system as well as a guide rail connected to the track system. As will be described below, the support structure can be used alone, or in combination with the guide rail.

Referring to FIG. 1, the track system 50 is operatively connected to the vehicle 20. The vehicle 20 is an all-terrain-vehicle (ATV). It is contemplated that in alternate embodiments, the vehicle 20 could be a snowmobile, a side-by-side vehicle, a utility-terrain vehicle or another recreational vehicle. It is also contemplated that the vehicle 20 could be a harvester, a tractor, or another agricultural vehicle. Other vehicles are contemplated, and the track system 50 including the present technology is structured and configured to be used on such vehicles. Though only the front right track system 50 is shown and described herein, the vehicle 20 includes front left, rear left and rear right track systems configured to be operatively connected to their respective corners of the vehicle 20. It is contemplated that in some embodiments, the vehicle 20 could be adapted to receive fewer than four track systems 50. In other embodiments, the vehicle 20 could be adapted to receive more than four track systems 50.

Figure 2:
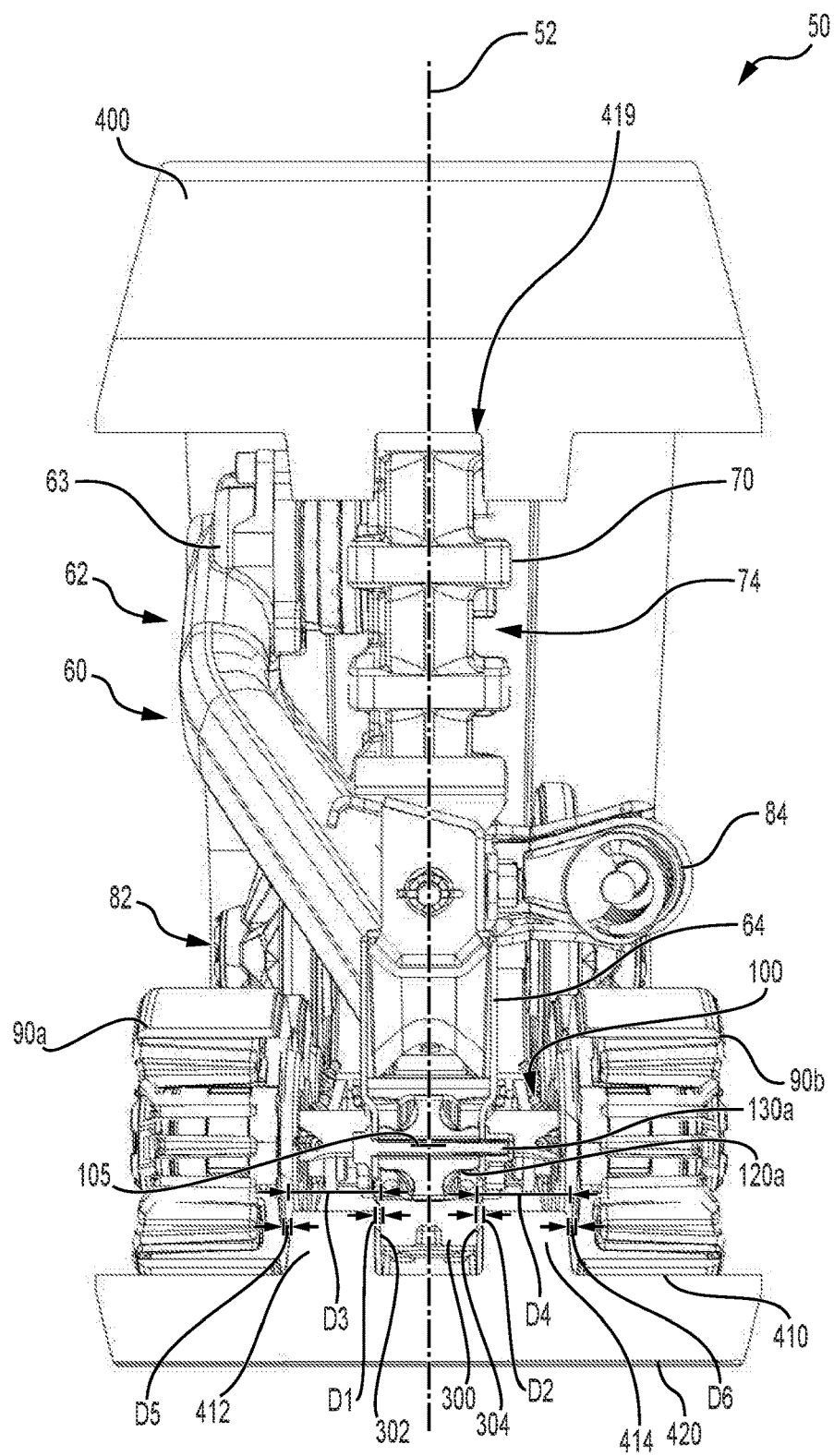
FIG. 2 is a cross-sectional view of the track system of FIG. 1 taken along the lines 2-2 of FIG. 1.
Figure 3:
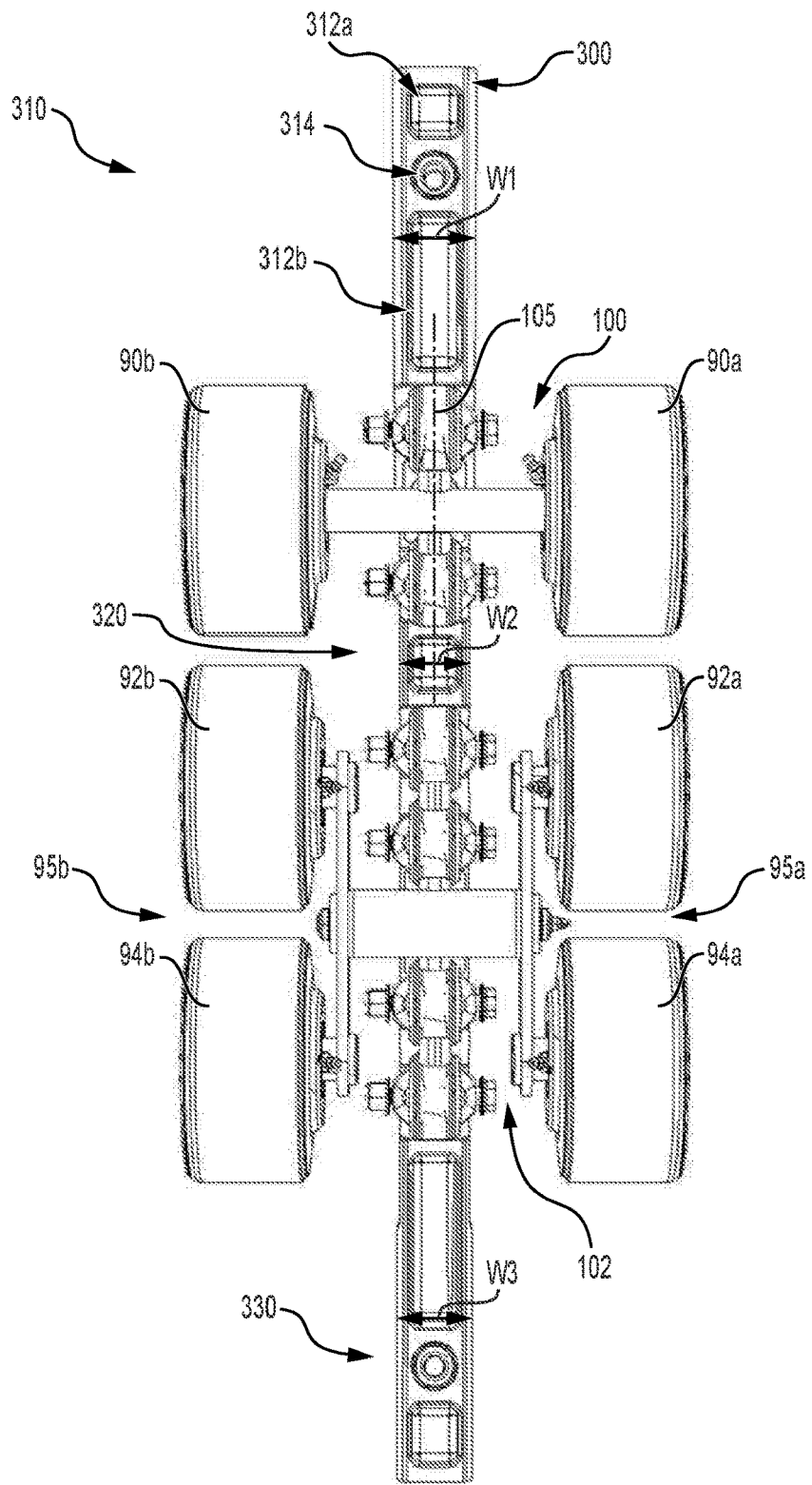
FIG. 3 is a top plan view of the guide rail of FIG. 1 connected to the support structures of FIG. 1 connected to support wheel assemblies.
Figure 4:
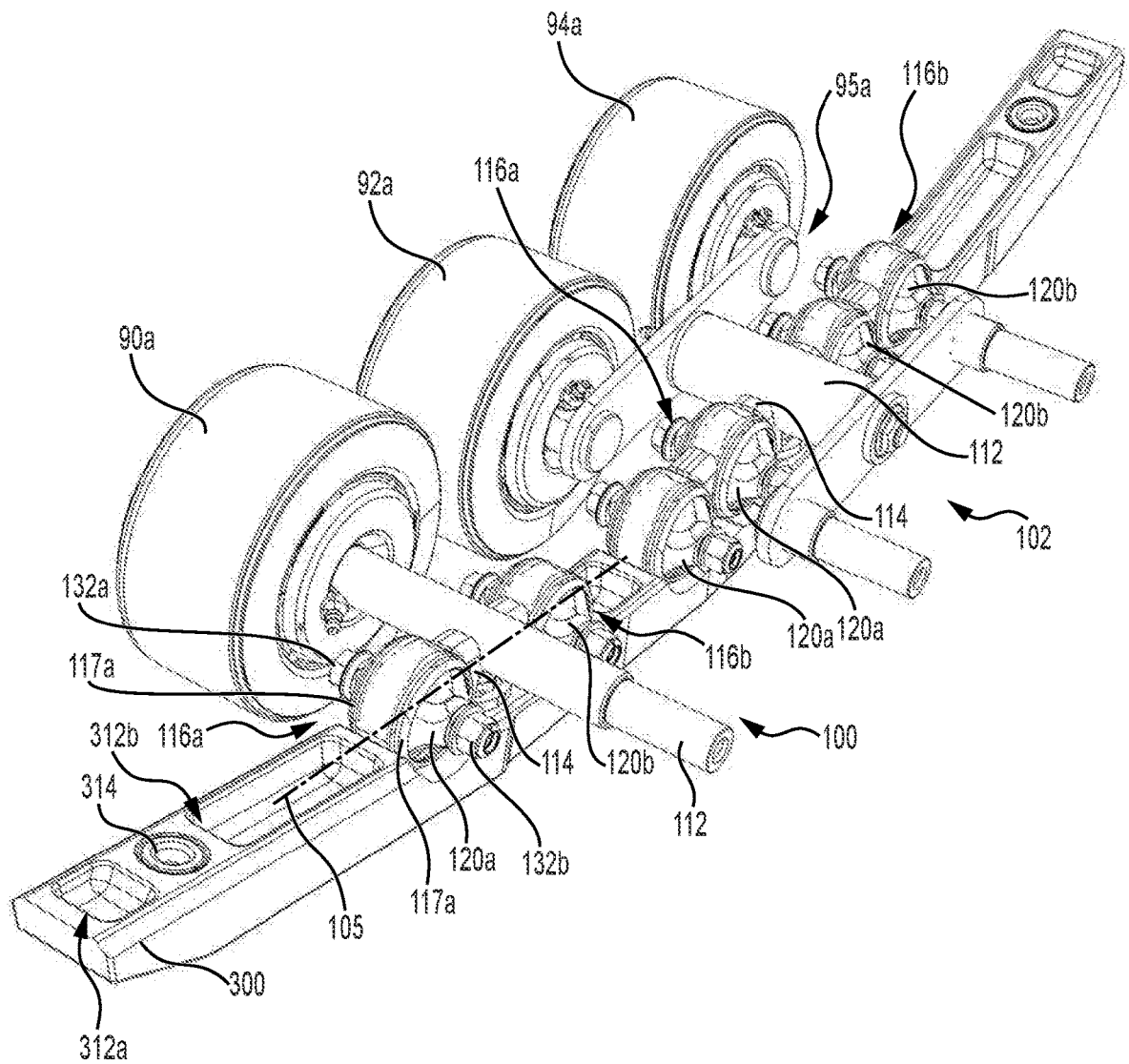
FIG. 4 is a perspective view taken from a top, front, left side of the guide rail and the support structures of FIG. 3, with support wheel assemblies being omitted.

Referring to FIGS. 1 to 3, the track system 50 defines a longitudinal center plane 52 (FIG. 3) that passes through the track system 50, and defines a left longitudinal side and a right longitudinal side of the track system 50. For the purpose of the following description, components that are qualified as "left" or "right" are positioned on the corresponding left longitudinal side and right longitudinal side of the track system 50 respectively, unless mentioned otherwise.

The track system 50 has a frame 60 that has an upper frame section 62 and a lower frame section 64. The upper frame section 62 has a connecting portion 63 configured to receive a portion of a driving axle (not shown) of the vehicle 20 therein. The lower frame section 64 extends generally in the longitudinal direction, and has a generally arcuate profile. As best seen in FIG. 3, the frame 60 is hollow. It is contemplated that in other embodiments, the frame 60 could not be hollow (i.e., that the frame 60 could be solid or at least partially solid).

The track system 50 also has a sprocket wheel assembly 70 that is rotationally connected to the frame 60. More precisely, the sprocket wheel assembly 70 is rotationally connected to the upper frame section 62. The sprocket wheel assembly 70 is also operatively connected to the driving axle such that a rotation of the driving axle drives the sprocket wheel assembly 70. The sprocket wheel assembly 70 defines recesses 74 that are longitudinally spaced on a circumference thereof. As will be described in greater detail below, recesses 74 are configured to receive lugs 412, 414 of an endless track 400.

The track system 50 has a front idler wheel assembly 80 and a rear idler wheel assembly 82, both of which are rotationally connected to the frame 62. More precisely, the front and rear idler wheel assemblies 80, 82 are rotationally connected to the lower frame section 64. Both of the front and rear idler wheel assemblies 80, 82 include two laterally spaced wheels. It is contemplated that in other embodiments, there could be more or less than two idler wheel assemblies. In some embodiments, one or both of the front and rear idler wheel assemblies 80, 82 could aid in distributing borne load to a ground surface, and as such could be support wheel assemblies. The track system 50 also includes a tensioner 84 operatively connected to the front idler wheel assembly 80. The tensioner 84 is operable to change the tension in the endless track 400 by moving the front idler wheel assembly 80. It is contemplated that in some embodiments, the tensioner 84 could be connected to the rear idler wheel assembly 82. It is also contemplated that in some embodiments, the tensioner 84 could be omitted.

As best seen in FIGS. 1, 3, 4 and 5A, the track system 50 also includes leading support wheel assemblies 90a, 90b that are laterally spaced, intermediate support wheel assemblies 92a, 92b that are laterally spaced and trailing support wheel assemblies 94a, 94b that are laterally spaced. The leading, intermediate and trailing support wheel assemblies 90a, 90b, 92a, 92b, 94a, 94b are together referred to as support wheel assemblies 90a, 90b, 92a, 92b, 94a, 94b. The intermediate and trailing support wheel assemblies 92a, 94a are connected to form a tandem wheel assembly 95a. Similarly, the intermediate and trailing support wheel assemblies 92b, 94b are connected to form a tandem wheel assembly 95b. It is contemplated that in some embodiments, there could be more or less than six support wheel assemblies. In yet other embodiments, there could be more or less than two tandem wheel assemblies. The leading support wheel assemblies 90a, 90b are rotationally connected to a support structure 100 (shown in FIG. 5A), and the tandem wheel assemblies 95a, 95b are connected to a support structure 102, where the support structures 100, 102 are connected to the frame 60. More precisely, the support structures 100, 102 are partly contained within the hollow portion of the lower frame section 64. The support structures 100, 102 will be described in greater detail below. It is understood that in embodiments where the number of support wheel assemblies changes, the number of support structures could change as well and vice-versa.

The track system 50 also includes a guide rail 300 that is connected to the frame 60. The guide rail 300, which generally extends in the longitudinal direction, will be described in greater detail below.

The track system 50 also includes the endless track 400 which surrounds the frame 50, the sprocket wheel assembly 70, the front and rear idler wheel assemblies 80, 82 and the support wheel assemblies 90a, 90b, 92a, 92b, 94a, 94b. The endless track 400 is an elastomeric track. It is contemplated that in some embodiments, the endless track 400 could be constructed of a wide variety of materials and structures including reinforcing members.

Referring to FIG. 2, the endless track 400 has an inner surface 410 and an outer surface 420. The inner surface 410 of endless track 400 has a longitudinal set of lugs 412 and a longitudinal set of lugs 414, which are positioned at a central portion of the inner surface 410. Each of the lugs of the longitudinal sets of lugs 412, 414 has an inner side and an outer side, where the inner side is proximate to the longitudinal center plane 52 compared to the outer side. The longitudinal sets of lugs 412, 414 are laterally spaced so as to define a passage 419 thereinbetween. The passage 419 is configured such that the guide rail 300 can be disposed therein, generally without interference with the longitudinal sets of lugs 412, 414. The lugs of the longitudinal sets of lugs 412, 414 are configured to be received in the recesses 74 of the sprocket wheel assembly 70. The support wheel assemblies 90a, 90b, 92a, 92b, 94a, 94b are configured to engage the inner surface 410 proximate to the central portion. It is contemplated that in other embodiments, there could be more or less than two sets of lugs and that the passage 419 could be omitted. The outer surface 420 of the endless track 400 has a tread (not shown) defined thereon. It is contemplated that the tread could vary from one embodiment to another. In some embodiments, the tread could depend on the type of ground surface on which the vehicle 20 is destined to travel.

Referring to FIGS. 3, 4, 5A and 6, a first embodiment of the support structures 100, 102 will now be described.

Figure 5A:
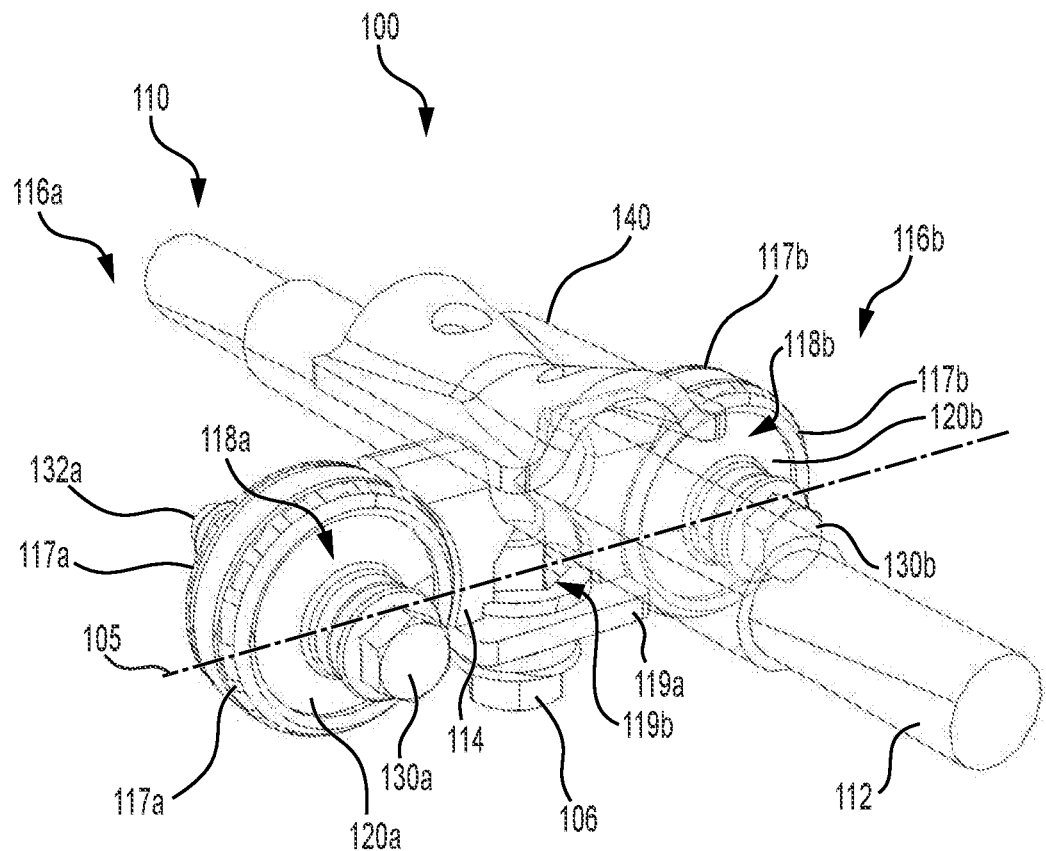
FIG. 5A is a perspective view taken from a top, front, left side of one of the support structures of FIG. 1 in an initial configuration.

The support structure 100 is configured to, as will be described in greater detail below, pivotally connect an axle assembly 110 to the frame 60, thereby enabling a pivotal movement of the support wheel assemblies 90a, 90b. The support structure 100 has an initial configuration at rest which is shown in FIG. 5A, and unless indicated otherwise, will be described in the initial configuration. The support structure 100 is connected to the frame 60 and is partly contained within the hollow lower frame section 64. It is contemplated that in some embodiments, the support structure 100 could be disposed outside of the frame 60.

The support structure 100 includes the axle assembly 110 which has an axle 112 and a longitudinal member 114. The axle 112 and the longitudinal member 114 are configured such that when one of the axle 112 and the longitudinal member 114 moves, the other moves also. For instance, if the axle 112 were to pivot in a clockwise direction, the longitudinal member 114 would also pivot in a clockwise direction and vice-versa. In some embodiments, the axle 112 and the longitudinal member 114 could be integral. The axle 112 extends laterally, and portions thereof extend outwardly from the lower frame section 64 (best seen in FIG. 2). The axle 112 is configured to be rotationally connected to the leading support wheel assemblies 90a, 90b. The longitudinal member 114 has a front end portion 116a and a rear end portion 116b. The front end portion 116a has two circular sections 117a that are laterally spaced and that are configured to receive a biasing component 120a therebetween. The circular sections 117a also define apertures 118a configured to laterally receive a connector 130a therethrough. Similarly, the rear end portion 116b has two circular sections 117b that are laterally spaced and that are configured to receive a biasing component 120b therebetween. The circular sections 117b also define apertures 118b configured to laterally receive a connector 130b therethrough. It is contemplated that in some embodiments, the circular sections 117a, 117b could be of another shape. The longitudinal member 114 also has a lower portion 119a defining an aperture 119b configured to receive a fastener 106. As will be described in greater detail below, the fastener 106 can fasten the guide rail 300 to the support structure 100.

Figure 5B:
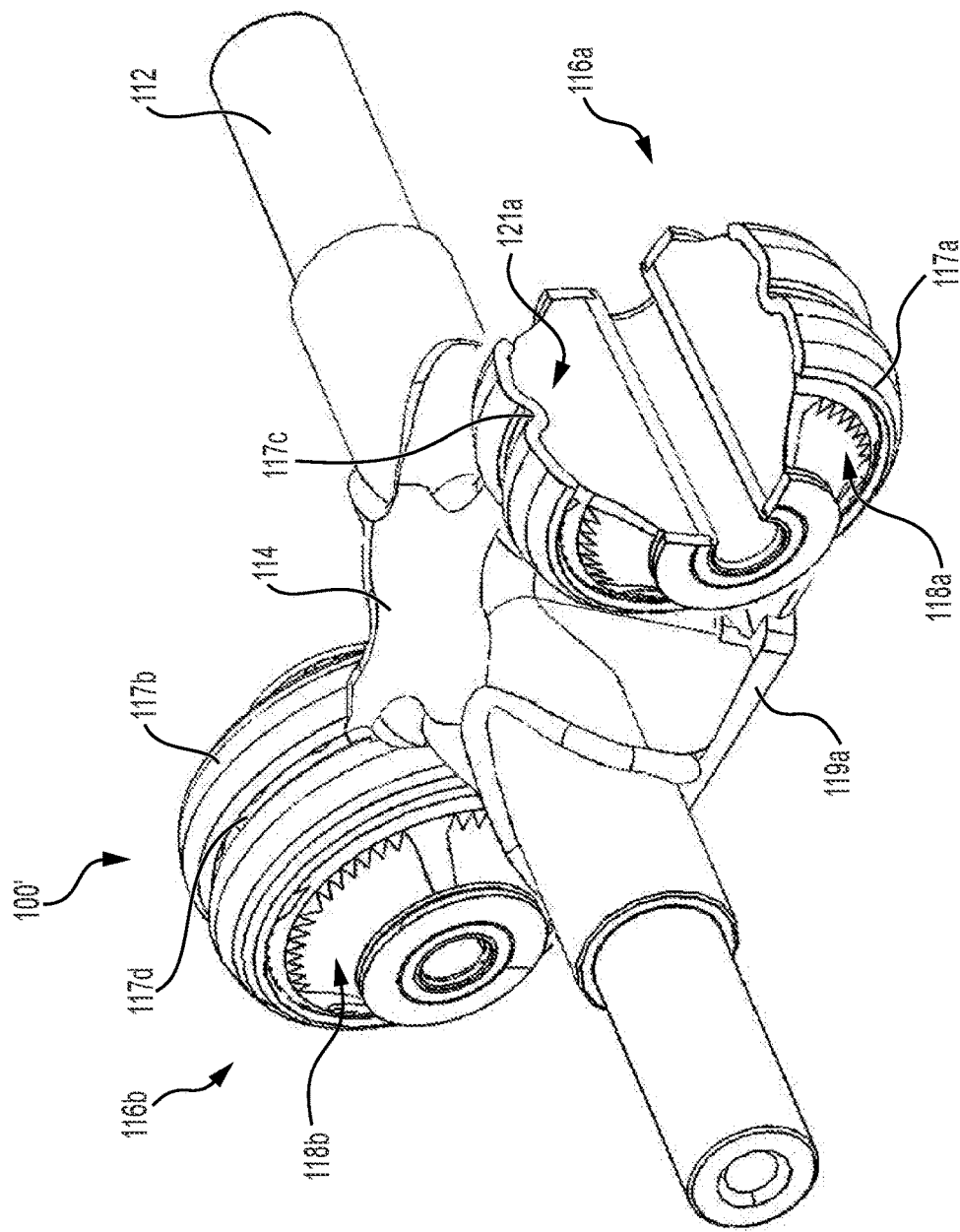
FIG. 5B is a perspective view taken from a top, front, right side of a support structure according to an alternate embodiment of the present technology, where the support structure is in an initial position.

Referring to FIG. 5B, in another embodiment of the support structure 100, namely support structure 100', the front end portion 116a has a single circular section 117a configured to receive the biasing component 120a therein. The circular section 117a has a segment 117c that extends radially inwardly from an inner surface of the circular section 117a. Similarly, the rear end portion 116b has a single circular section 117b configured to receive the biasing component 120b therein. The circular section 117b has segment 117d that extends radially inwardly from the inner surface of the circular section 117b. As will be described below, the segments 117c, 117d are configured to, respectively, engage with the biasing components 120a, 120b.

Referring back to FIGS. 3, 4, 5A and 6, the support structure 100 includes the front biasing component 120a that is in contact with the front end portion 116a of the longitudinal member 114, and the rear biasing component 120b that is in contact with the rear end portion 116b of the longitudinal member 114. More precisely, the biasing component 120a is surrounded by the two laterally spaced circular section 117a, and the biasing component 120b is surrounded by the two laterally spaced circular sections 117b. It is understood that the front and rear biasing components 120a, 120b could be connected to the longitudinal member 114 differently. In some embodiments, the front and rear biasing components 120a, 120b could be configured to be removable from the front and rear end portions 116a, 116b. The front and rear biasing components 120a, 120b are made from a resilient material such as, for example and without limitation, rubber. The front and rear biasing components 120a, 120b are thus resiliently deformable. When deformed from an initial configuration, the front and rear biasing components 120a, 120b are biased to return to their respective initial configuration. As will be described in greater detail below, the front and rear biasing components 120a, 120b are configured such that when the front and rear end portions 116a, 116b move, the front and rear end portions 116a, 116b respectively resiliently deform the front and rear biasing components 120a, 120b.

Referring back to FIG. 5B, in the support structure 100', similarly to the support structure 100, the front biasing component 120a is configured to be received in the circular section 117a, and the rear biasing component 120b is configured to be received in the circular section 117b. More precisely, in the support structure 100', the front biasing component 120a defines a front recess 121a that extends radially inwardly from an outer surface of the biasing component 120a and that is configured to receive the segment 117c therein. Similarly, the rear biasing component 120b defines a rear recess (not shown) that extends radially inwardly from an outer surface of the biasing component 120b and that is configured to receive the segment 117d therein. When the front biasing component 120a is received in the front circular section 117a, the segment 117c is received in the front recess 121a, and when the rear biasing component 120b is received in the rear circular section 117b, the segment 117d is received in the rear recess. This results in the front and rear biasing components 120a, 120b being, respectively, mechanically interlocked with the front and rear circular sections 117a, 117b, which can reduce chances of the front and rear biasing components from, respectively, slipping out of the front and rear circular sections 117a, 117b.

Referring back to FIGS. 3, 4, 5A and 6, the support structure 100 also includes the front connector 130a and the rear connector 130b. In the present embodiment, the front and rear connectors 130a, 130b, which are removably connectable to the frame 60, extend generally laterally relative to the longitudinal member 114, and are substantially perpendicular to the longitudinal direction and to the longitudinal center plane 52. The front and rear connectors 130a, 130b are vertically spaced from the axle 112. More precisely, the first and second connectors 130a, 130b are below the axle 112. As will be described in greater detail below, having the first and second connectors 130a, 130b below the axle 112 can help to reducing the lateral displacement of the support wheels connected to the support structure 200 with respect to the inner surface 410 of the endless track 400. In the present embodiment, the front and rear connectors 130a, 130b are front and rear bolts 130a, 130b. It is contemplated that in other embodiments, the front and rear connectors 130a, 130b could be other connectors such as connecting pins and studs. The front and rear bolts 130a, 130b are connected to the frame 60 by being respectively fastened with front and rear nuts 132a, 132b. The front connector 130a, which extends through the aperture 118a, is connected to the front biasing component 120a such that the front biasing component 120a surrounds the front connector 130a. Likewise, the rear connector 130b, which extends through the aperture 118b, is connected to the rear biasing component 130b such that the rear biasing component 120b surrounds the connector 130b. It is contemplated that in some embodiments, the biasing components 120a, 120b could not surround the connectors 130a, 130b. For instance, in some embodiments, the biasing components 120a, 120b could only partially surround the connectors 130a, 130b, or not at all. Once connected to the frame 60, the front and rear connectors 130a, 130b are generally fixed relative to the frame 60, and help to keep the front and rear biasing components 120a, 120b generally stationary relative to the frame 60.

The support structure 100 defines a longitudinal pivot axis 105 that is generally laterally centered relative to the support structure 100, and that extends through the front and rear connectors 130a, 130b. It is contemplated that in some embodiments, the longitudinal pivot axis 105 could be offset relative to the support structure 100 such that the leading support wheel assemblies 90a, 90b could apply an asymmetric pressure on the ground. As the front and rear connectors 130a, 130b are vertically below the axle 112, the longitudinal pivot axis 105 is also vertically below spaced from the axle 112. The support structure 100 is configured such that the axle assembly 110 can pivot about the longitudinal pivot axis 105.

The support structure 100 also includes a stopper 140 that is connected to the frame 60. It is contemplated that the stopper 140 could be integrated to the frame 60. The stopper 140 is configured to limit to pivotal range of motion of the axle assembly 110 by engaging with the axle 112 when the axle assembly 110 has pivoted a certain amount. In some embodiments, the stopper 140 is configured to limit the pivotal range of motion of the axle assembly 110 to about 15 degrees in each direction (i.e., 15 degrees clockwise and 15 degrees counter-clockwise). In other embodiments, the pivotal range of motion of the axle assembly 110 could be limited to about 10 degrees in each direction (i.e., 10 degrees clockwise and 10 degrees counter-clockwise). In yet other embodiments, the pivotal range of motion of the axle assembly 110 could be limited to about 5 degrees in each direction (i.e., 5 degrees clockwise and 5 degrees counter-clockwise).

Figure 6:
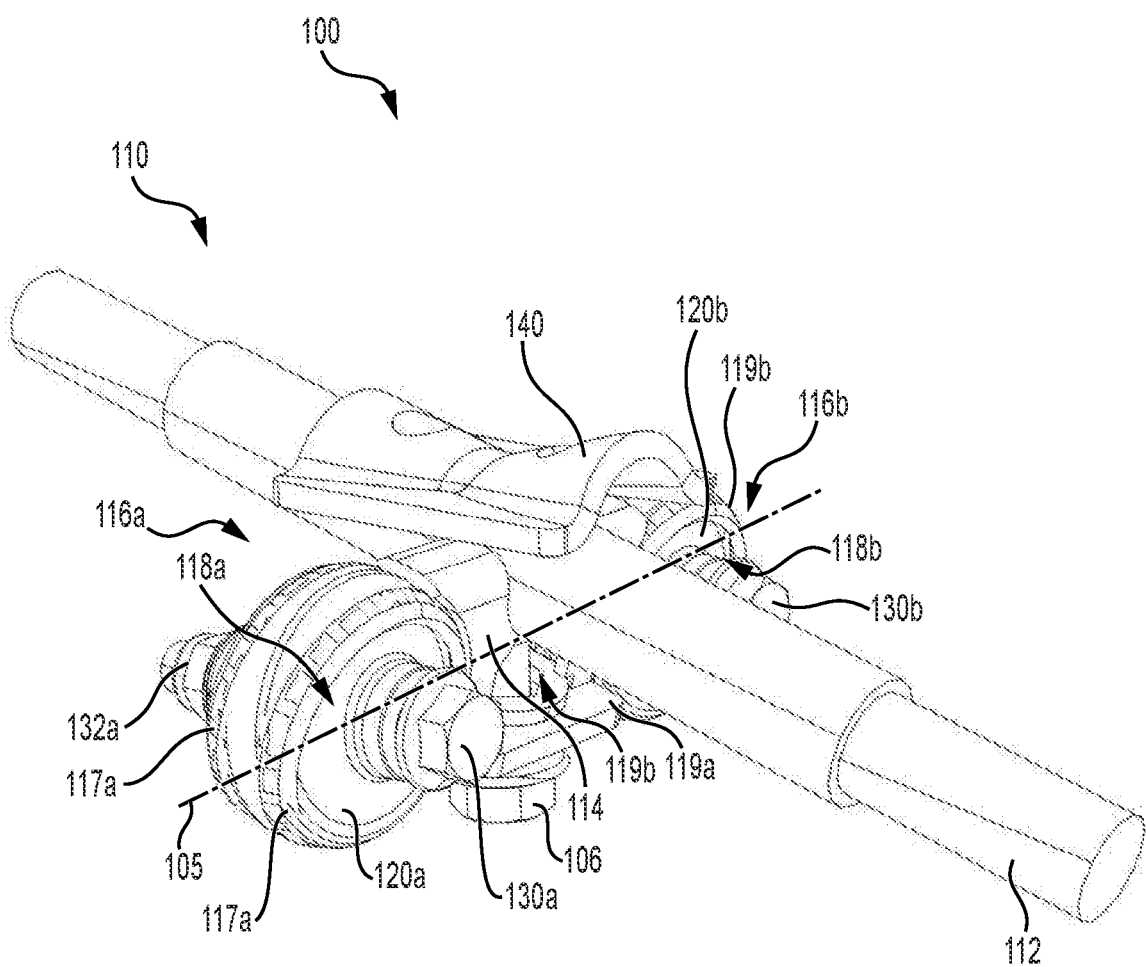
FIG. 6 is a perspective view taken from a top, front, left side of one of the support structures of FIG. 5A in a second configuration.

Referring to FIGS. 5A and 6, the support structure 100 in operation will now be broadly described. When the track system 50 is on a generally flat, level surface, the support structure 100 is in the initial configuration, as shown in FIG. 5A. When the track system 50 encounters an obstacle such as a rock on a lateral side thereof, and the obstacle reaches a position below the wheel assembly 90a for instance, the leading wheel assembly 90a moves vertically upwards and the leading wheel assembly 90b moves vertically downwards such that the axle assembly 110 pivots about the longitudinal axis 105, as shown in FIG. 6. It is contemplated that the leading wheel assembly 90a could move vertically downwards and the leading wheel assembly 90b could move vertically upwards when the obstacle is a ditch. The front and rear end portions 116a, 116b also pivot about the longitudinal axis 105, which results in the front and rear biasing components 120a, 120b resiliently deforming. As soon as the front and rear biasing components 120a, 120b resiliently deform, the front and rear biasing components 120a, 120b bias the support structure 100 toward the initial configuration, which can help overcome the obstacle. In some embodiments, where the obstacle is too large, the stopper 140 could limit the pivotal motion of the axle assembly 110. The support structure 100 is configured such that upon pivotal motion of the axle assembly 110, forces acting on the front and rear biasing components 120a, 120b are mostly shear and compressive forces, rather than mostly torsional forces. This can help extend the life of the front and rear biasing components 120a, 120b. Furthermore, the longitudinal pivot axis 105 being below the axle 112 results in reducing the lateral displacement of the wheel assemblies 90a, 90b relative to the inner surface 410 of the endless track 400 when the axle 112 pivots about the longitudinal pivot axis 105. This can help to reduce wear on the inner side of the lugs of the longitudinal sets of lugs 412, 414 as well as on the support wheel assemblies 90a, 90b.

Support structure 102 is generally similar to the support structure 100, and hence will not be described in detail herewith. The support structure 102, which is configured to connect to the tandem assemblies 95a, 95b, includes two front biasing components 120a, two rear biasing components 120b, two front connectors 130a, and two rear connectors 130b. The longitudinal member 114 of the support structure 102 is configured to connect to the two front and rear biasing components 120a, 120b and the two front and rear connectors 130a, 130b similarly to the support structure 100. It is understood that having two front biasing components 120a and two rear biasing components 120b can help to stabilize the wheel assemblies laterally.

Figure 7:
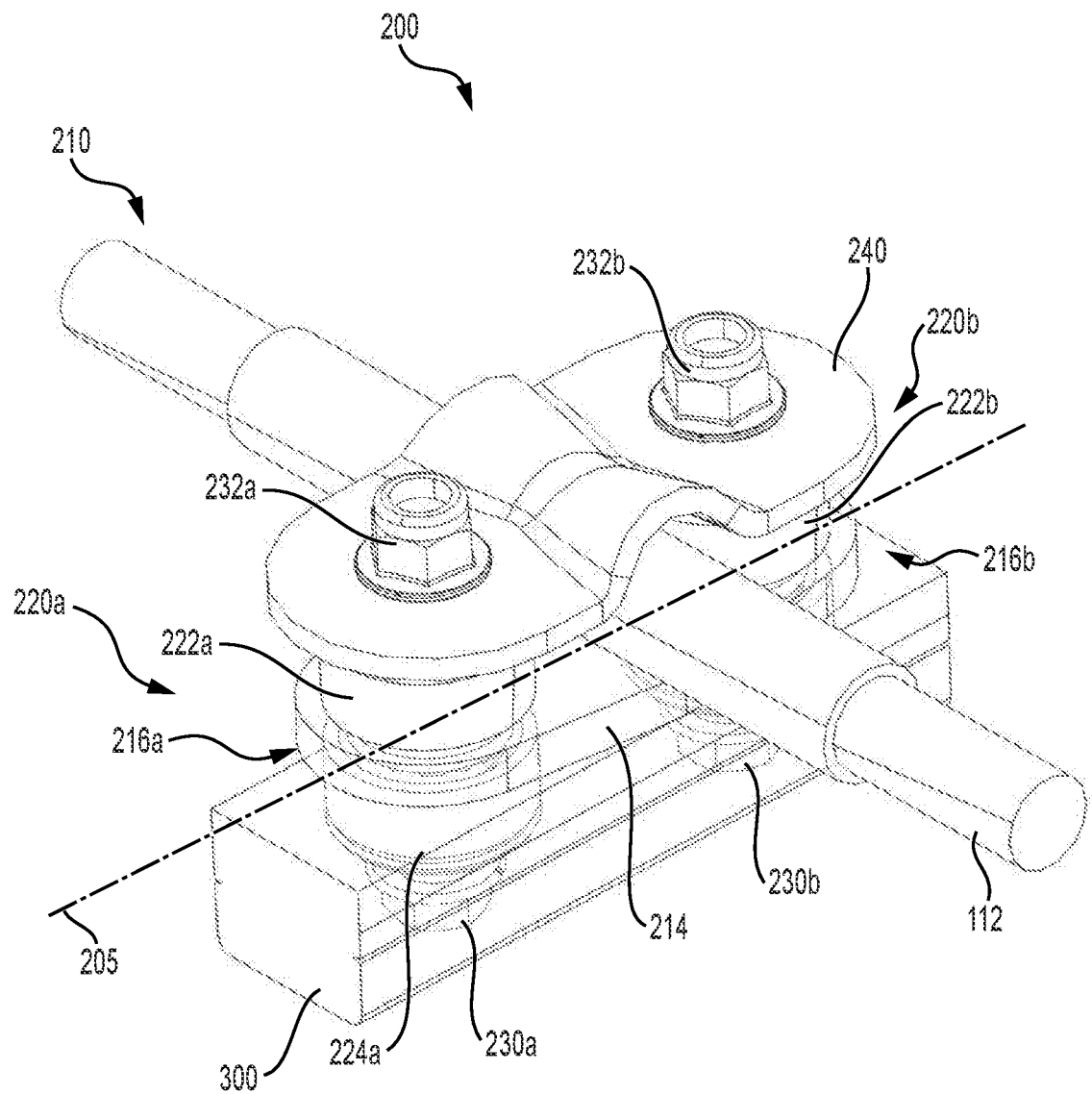
FIG. 7 is a perspective view taken from a top, front, left side of a support structure according to an alternate embodiment of the present technology of the track system of FIG. 1.
Figure 8:
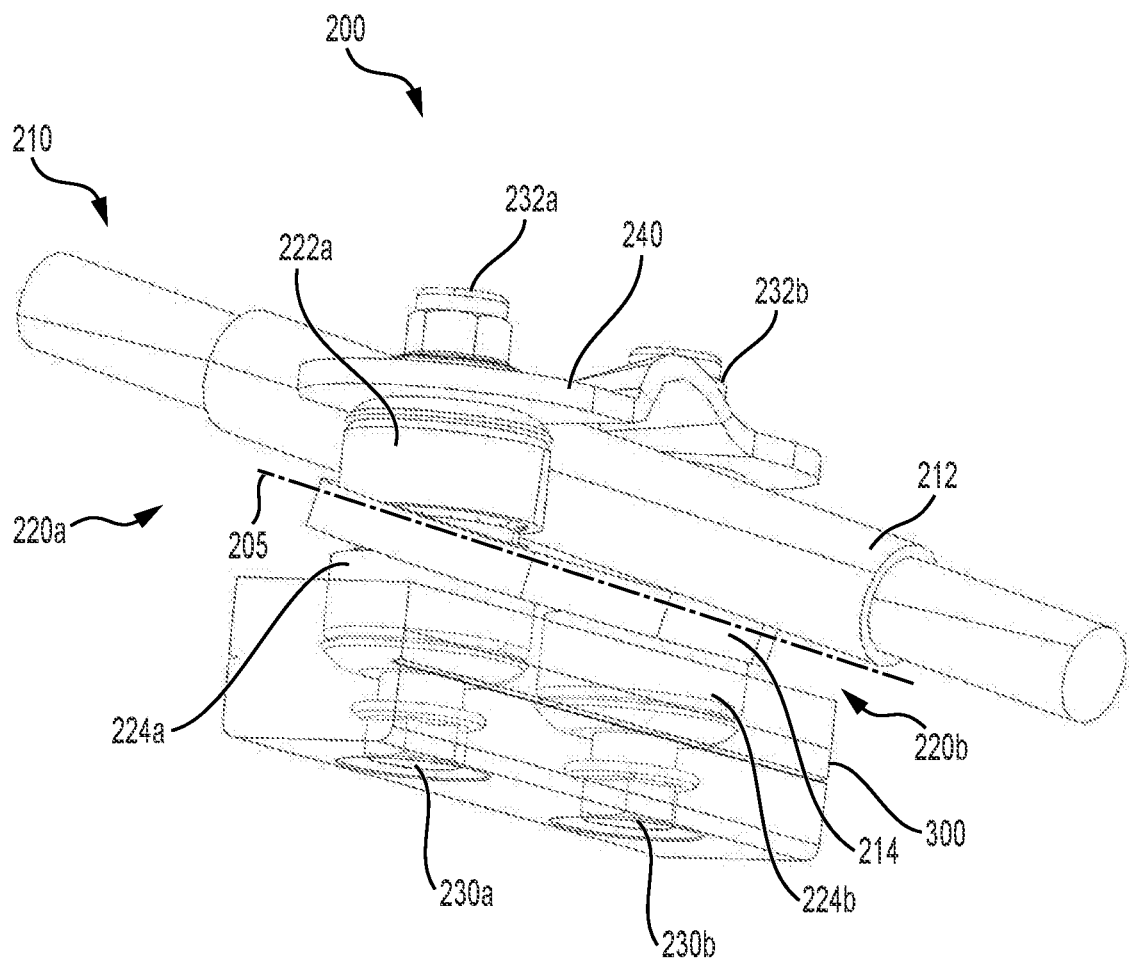
FIG. 8 is a perspective view taken from a bottom, front, left side of the support structure of FIG. 7.

Referring to FIGS. 7 and 8, a second embodiment of the support structure 100, namely support structure 200, will now be described. Similarly to the support structure 100, the support structure 200 is configured to pivotally connect an axle assembly 210 to the frame 60, thereby enabling a pivotal movement of the support wheel assemblies 90a, 90b. It is understood that the support structure 200 could be configured to connect to the tandem assemblies 95a, 95b. The support structure 200 has an initial configuration at rest (FIG. 7), and unless indicated otherwise, the support structure 200 will be described in the initial configuration.

The support structure 200 includes the axle assembly 210 which has an axle 212 and a longitudinal member 214. The axle 212 and the longitudinal member 214 are configured such that when one of the axle 212 and the longitudinal member 214 moves, the other moves also. For instance, if the axle 212 were to pivot in a clockwise direction, the longitudinal member 214 would also pivot in a clockwise direction and vice-versa. In some embodiments, the axle 212 and the longitudinal member 214 could be integral. The axle 212 extends laterally and is configured to be rotationally connected to the leading support wheel assemblies 90a, 90b. The longitudinal member 214 has a front end portion 216a and a rear end portion 216b. The longitudinal member 214 defines an aperture (not shown) at each of the front and rear end portions 216a, 216b. Furthermore, the axle 212 and the longitudinal member 214 are configured such that the axle 212 is vertically above the longitudinal member 214.

The support structure 200 also includes a front biasing component 220a and a rear biasing component 220b. The front biasing component 220a includes a front top biasing portion 222a that is in contact with a top side of the longitudinal member 214 at the front end portion 216a, and a front bottom biasing portion 224a that is in contact with a bottom side of the longitudinal member 214 at the front end portion 216a. Similarly, the rear biasing component 220b includes a rear top biasing portion 222b that is in contact with the top side of the longitudinal member 214 at the rear end portion 216b, and a rear bottom biasing portion 224b that is in contact with a bottom side of the longitudinal member 214 at the rear end portion 216b. The front top and bottom biasing portions 222a, 224a each define an aperture extending vertically therethrough configured to receive a front connector 230a therethrough. Likewise, the rear top and bottom biasing portions 222b, 224b each define an aperture extending vertically therethrough configured to receive a rear connector 230b therethrough. In some embodiments, the front and rear biasing components 220a, 220b could be configured to be removable from the front and rear end portions 216a, 216b. The front and rear biasing components 220a, 220b are made from a resilient material such as, for example and without limitation, rubber. The front and rear biasing components 220a, 220b are thus resiliently deformable. When deformed from an initial configuration, the front and rear biasing components 220a, 220b are biased to return to their respective initial configuration. As will be described in greater detail below, the front and rear biasing components 220a, 220b are configured such that when the front and rear end portions 216a, 216b move, the front and rear end portions 216a, 216b respectively resiliently deform the front and rear biasing components 220a, 220b.

Still referring to FIGS. 7 and 8, the support structure 200 also includes the front connector 230a and the rear connector 230b. In the present embodiment, the front and rear connectors 230a, 230b, which are removably connectable to the frame 60, extend generally vertically relative to the longitudinal member 214, and are substantially perpendicular to the longitudinal direction and to the longitudinal center plane 52. The front connector 230a extends through an aperture defined in a stopper 240, through the aperture defined in the front top biasing portion 222a, through the aperture defined in the longitudinal member 214 at the front end portion 216a, through the aperture defined in the front bottom biasing portion 224a and through an aperture defined in the guide rail 300. Likewise, the rear connector 230b extends through an aperture defined in the stopper 240, through the aperture defined in the rear top biasing portion 222b, through the aperture defined in the longitudinal member 214 at the rear end portion 216b, through the aperture defined in the rear bottom biasing portion 224b and through an aperture defined in the guide rail 300. In the present embodiment, the front and rear connectors 230a, 230b are front and rear bolts 230a, 230b, that are connected to the frame 60 by being respectively fastened with front and rear nuts 232a, 232b. It is contemplated that in other embodiments, the front and rear connectors 230a, 230b could be other connectors such as connecting pins and studs.

The support structure 200 defines a longitudinal pivot axis 205 that is generally laterally centered relative to the support structure 200, and that extends through the longitudinal member 214. It some embodiments, the longitudinal pivot axis 205 can be offset relative to the support structure 200. The axle assembly 210 is free to pivot about the longitudinal pivot axis 205. In some embodiments, the axle assembly 210 could be configured such that the longitudinal member 214 is connected to, but vertically below the axle 212. In such embodiments, the longitudinal pivot axis 205 is vertically spaced from the axle 212.

The support structure 200 also includes the stopper 240 which is connected to the frame 60. It is contemplated that the stopper 240 could be integrated to the frame 60. The stopper 240 is configured to limit to pivotal range of motion of the axle assembly 210 by engaging with the axle 212 when the axle assembly 210 has pivoted a certain amount. In some embodiments, the stopper 240 is configured to limit the pivotal range of motion of the axle assembly 210 to about 15 degrees in each direction (i.e., 15 degrees clockwise and 15 degrees counter-clockwise). In other embodiments, the pivotal range of motion of the axle assembly 210 could be limited to about 10 degrees in each direction (i.e., 10 degrees clockwise and 10 degrees counter-clockwise). In yet other embodiments, the pivotal range of motion of the axle assembly 210 could be limited to about 5 degrees in each direction (i.e., 5 degrees clockwise and 5 degrees counter-clockwise).

Still referring to FIGS. 7 and 8, the support structure 200 in operation will now be broadly described. Initially, when the track system 50 is on a generally flat, level surface, the support structure 200 is in the initial configuration, as shown in FIG. 7. When the track system 50 encounters an obstacle such as a rock on a lateral side thereof, and the obstacle reaches a position below the leading wheel assembly 90a for instance, the leading wheel assembly 90a moves vertically upwards, and the leading wheel assembly 90b moves vertically downwards such that the axle assembly 210 pivots about the longitudinal axis 205, as shown in FIG. 8. It is contemplated that the leading wheel assembly 90a could move vertically downwards and the leading wheel assembly 90b could move vertically upwards when the obstacle is a ditch. Thus, the front and rear end portions 216a, 216b also pivot about the longitudinal axis 205, which results in the front and rear biasing components 220a, 220b resiliently deforming. As soon as the front and rear biasing components 120a, 120b resiliently deform, the front and rear biasing components 220a, 220b bias the support structure 200 back toward the initial configuration, which can help overcome the obstacle. In some embodiments, where the obstacle is too large, the stopper 240 could limit the pivotal motion of the axle assembly 110. The support structure 200 is configured such that upon pivotal motion of the axle assembly 210, forces acting on the front and rear biasing components 220a, 220b are mostly compressive forces, rather than mostly torsional forces. This can help extend the life of the front and rear biasing components 220a, 220b. Furthermore, the longitudinal pivot axis 205 being below the axle 212 results in reducing the lateral displacement of the wheel assemblies 90a, 90b relative to the inner surface 410 of the endless track 400 when the axle 212 pivots about the longitudinal pivot axis 205. This can help to reduce wear on the inner side of the lugs of the longitudinal sets of lugs 412, 414 as well as on the support wheel assemblies 90a, 90b.

Henceforth, when reference is made to the support structures 100, 102, it is understood that the support structure 200 could be used.

Figure 9:
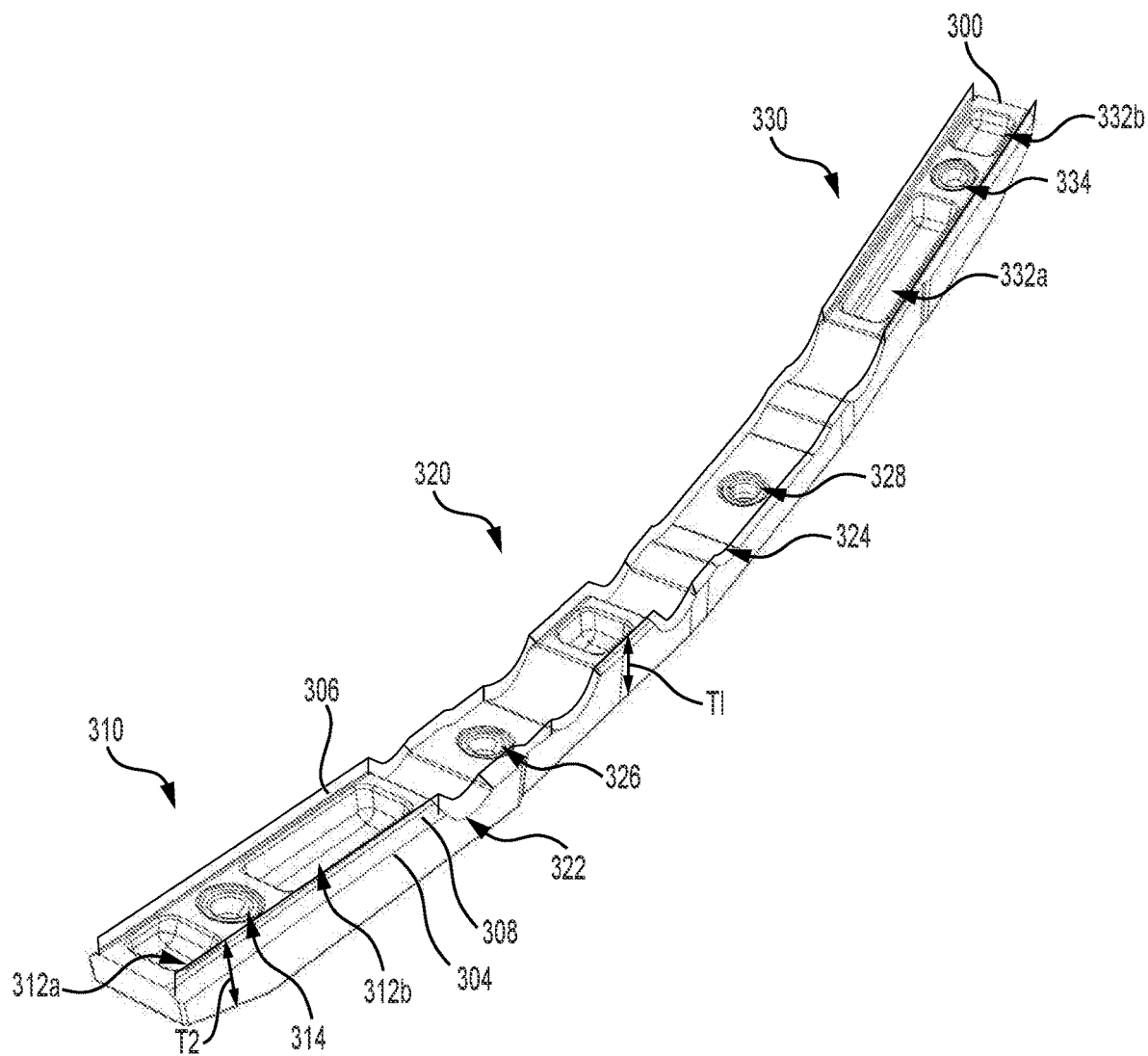
FIG. 9 is a perspective view taken from a top, front, left side of the guide rail of FIG. 1.
Figure 10:
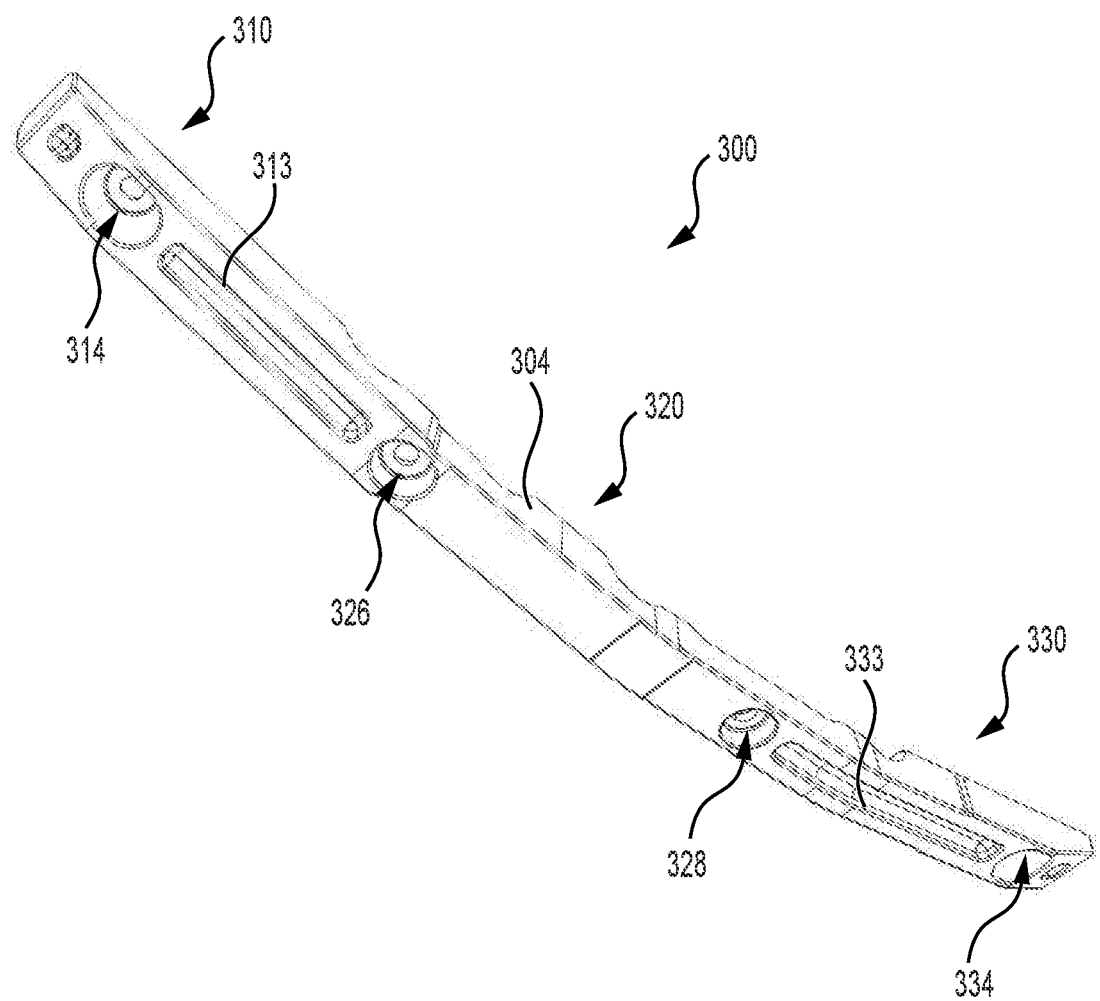
FIG. 10 is a perspective view taken from a bottom, front, left side of the guide rail of FIG. 1.

Referring now to FIGS. 3, 9 and 10, the guide rail 300 is connected to the frame 60 such that the guide rail 300 is vertically spaced from the inner surface 410 of the endless track 400, and is contained within the passage 419. In some embodiments, the guide rail 300 could be connected to the frame 60 by the support structure 100. The guide rail 300 is resiliently deformable. In some embodiments, the guide rail 300 is configured to be more torsionally deformable, while being vertically and horizontally more rigid. In some embodiments, the guide rail 300 is configured to deform similarly to the endless track 400, such that the guide rail 300 has horizontal, vertical and torsional rigidities similar to horizontal, vertical and torsional rigidities of the endless track 400. In some embodiments, the guide rail 300 is made from a material with a low coefficient of friction, such as ultra-high molecular weight polyethylene (UHMW-PE).

The guide rail 300 is configured to conform to a shape of the frame 60. In some instances, such as shown in FIG. 1, the lower frame section 64 has an arcuate profile, and as such the guide rail 300 also has an arcuate profile. The guide rail 300 is one integral component. It is contemplated that in some embodiments, the guide rail 300 could be made of two or more connected segments. The guide rail 300 is configured to be removably connected from the frame 60, such that the guide rail 300 could be replaced by another guide rail 300. The guide rail 300 has a base surface 301, which as will be described below is contactable by guide rail contacting portions of the support structures 100, 102, as well as a bottom surface, which as will also be described below is contactable by the inner surface 410 of the endless track 400. The guide rail 300 has a right lateral guide rail side 302 and a left lateral guide rail side 304. The guide rail 300 also has a right side portion 306 that extends generally perpendicularly to the base surface 301, and a left side portion 308 that extends generally perpendicularly to the base surface 301. The left and right side portions 306, 308 enhance vertical and horizontal rigidity of the guide rail 300. The guide rail 300 has a leading portion 310, an intermediate portion 320 and a trailing portion 330.

Still referring to FIGS. 3, 9 and 10, the leading portion 310 defines upper recesses 312a, 312b, a lower recess 313 as well as an aperture 314. The upper and lower recesses 312a, 312b, 313 are configured to reduce the weight the guide rail 300, and could be omitted or disposed elsewhere in some embodiments. For example, in some embodiments, there could be only one upper recess. In some embodiments, the upper and lower recesses 312a, 312b, 313 could help modify the rigidity of the guide rail 300. The aperture 314 is configured to receive a fastener therethrough thereby connecting the guide rail 300 to the front idler wheel assembly 80. It is contemplated that the guide rail 300 could be connected otherwise.

The intermediate portion 320 defines a leading recess 322 and a trailing recess 324. The leading and trailing recesses 322, 324 are respectively configured to receive a portion of the support structure 100 and a portion of the support structure 102 therein. In some embodiments, the leading and trailing recesses 322, 324 could be omitted such that the guide rail 300 has generally flat base surface 301. The intermediate portion 320 also defines a leading aperture 326 and a trailing aperture 328. The leading aperture 326 is configured to receive a fastener therethrough, thereby connecting the guide rail 300 to the support structure 100. The trailing aperture 328 is configured to receive a fastener therethrough, thereby connecting the guide rail 300 to the support structure 102. It is contemplated that the guide rail 300 can be connected otherwise, such that the leading and trailing apertures 326, 328 could be omitted. The intermediate portion 320 does not define any recess at a bottom side thereof, as the intermediate portion could be subject to more wear than the leading and trailing portions 310, 320 such that the additional material could prolong life of the guide rail 300. It is contemplated, however, that in some embodiments, the intermediate portion 330 could define one or more recesses on a bottom side of the guide rail 300.

The trailing portion 330 defines two upper recesses 332a, 332b, a lower recess 333 as well as an aperture 334. The upper and lower recesses 332a, 332b, 333 are configured to reduce the weight the guide rail 300, and could be omitted or disposed elsewhere in some embodiments. For example, in some embodiments, there could be only one upper recess. In some embodiments, the upper and lower recesses 332a, 332b, 333 could help modify the rigidity of the guide rail 300. The aperture 334 is configured to receive a fastener therethrough thereby connecting the guide rail 300 to the rear idler wheel assembly 82. It is contemplated that the guide rail 300 could be connected otherwise.

It is contemplated that in other embodiments, the guide rail 300 could have more or less recesses and/or apertures defined therein. In some embodiments, the recesses could be omitted, such that the guide rail 300 could have a generally flat base surface 301.

Referring now to FIG. 2, and focusing on the support structure 100 and the intermediate portion 320, a distance D1 extends between the right lateral guide rail side 302 and the inner side of the support wheel 90a, a distance D2 extends between the left lateral guide rail side 304 and the inner side of the support wheel 90b. A distance D3 extends between the right lateral guide rail side 302 and the inner side of the longitudinal set of lugs 412, and a distance D4 extends between the left lateral guide rail side 304 and the inner side of the longitudinal set of lugs 414. A distance D5 extends between the outer side of the longitudinal set of lugs 412 and the inner side of the support wheel 90a and a distance D6 extends between the outer side of the longitudinal set of lugs 414 and the inner side of the support wheel 90b. In some embodiments, distances D1, D2, D5, D6 could be the same. As will be described in greater detail below, the guide rail 300 is configured to resiliently deform to maintain distances D1, D2, D3, D4, D5 and D6 substantially the same under operation.

Referring to FIG. 3, in some embodiments of the guide rail 300, the leading portion 310 has a width W1 that extends from the right lateral guide rail side 302 to the left lateral guide rail side 304, the intermediate portion 320 has a width W2 that extends from the right lateral guide rail side 302 to the left lateral guide rail side 304, and the trailing portion 330 has a width W3 that extends from the right lateral guide rail side 302 to the left lateral guide rail side 304. In some embodiments, a given one of the widths W1, W2, W3 could differ from one to another. In some embodiments, the width W1 is greater than the widths W2 and W3, and the width W3 is greater than the width W2. Thus, the width of the guide rail 300 is greater at the leading and trailing portions 310, 330 compared to the intermediate portion 320. It is contemplated that in other embodiments, width W3 could be greater than width W1 and/or W2. Other such combinations are contemplated. In some embodiments the guide rail 300 could have a generally constant width across the leading, intermediate and trailing portions 310, 320, 330 (i.e., widths W1, W2, W3 are the same). In some embodiments, having a greater width could be analogous to having increased horizontal rigidity. Having an increased rigidity at the leading and trailing portions 310, 330 could aid in reducing chances of de-tracking, as the guide rail 300 acts as a guide to the endless track 400. This can be particularly useful in embodiments where the track system 50 is a steerable track system, as steerable track systems can be prone to more deformation when steered.

Referring to FIG. 9, in some embodiments, the guide rail 300 has a thickness that varies longitudinally. Having greater thicknesses at points along the guide rail 300 that will be subject to more wear can increase life of the guide rail 300 while reducing manufacturing resources. Having different thicknesses at points along the guide rail 300 can allow modulation of the vertical, horizontal and/or torsional rigidity of the guide rail 300. A thickness T1 is measured from the base surface 301 to the bottom surface of the guide rail 300 at a point located in the intermediate portion 320, longitudinally disposed between the support structure 100 and the support structure 102. A thickness T2 is measured from the base surface 301 to the bottom surface of the guide rail 300 at a point located in the leading portion 310. It is contemplated that the thicknesses T1, T2 could be measured elsewhere along the guide rail 300. The guide rail 300 is configured such that the thickness T1 is greater than the thickness T2, because T1 will be subject to more wear, for instance due to contact with the inner surface 410 of the endless track 400. This can increase life the guide rail 300. It is contemplated that in some embodiments, the thickness of the guide rail 300 could vary along a width thereof (i.e., the guide rail 300 could be thicker at a center thereof than at the left and right guide rail sides 302, 304). In some embodiments, having a greater thickness could be analogous to having increased vertical rigidity. In some embodiments, the guide rail 300 could have a thickness that is uniform throughout the length of the guide rail 300.

A broad description of the guide rail 300 working in conjunction with the support structures 100, 102 will now be provided. The support structure 100 is received in the leading recess 322, and the support structure 102 is received in the trailing recess 324. As the support structures 100, 102 operate with the guide rail 300 similarly, the present broad description will focus on the support structure 100. The longitudinal member 114 is in contact with the guide rail 300. More precisely, the circular sections 117a of the front end portion 116a and the circular sections 117b of the rear end portion 116b are the guide rail contacting portions. In other embodiments, the support structure 100 could include another guide rail contacting portion (i.e., in the case of support structure 200, the front and rear bottom biasing components 222b, 224b would be the guide rail contacting portions). As described above, the support structure 100 is configured so that the axle assembly 110, and thus the longitudinal member 114, can pivot about the longitudinal pivot axis 105. When the longitudinal member 114 pivots about the longitudinal pivot axis 105, for instance when the track system 50 is overcoming an obstacle, the guide rail 300, because of the support structure 100, is configured to resiliently deform such initial distances D1, D2, D3, D4, D5 and D6 remain substantially the same during operation. This can reduce chances of the endless track 400 de-tracking as well as reducing wear on the support wheel assemblies 90a, 90b.

It is understood that in some embodiments of the track system 50, the track system 50 could include the support structures 100, 102 without having the guide rail 300.

The track system 50 as a whole in operation will now be described as the track system 50 encounters and overcomes an obstacle. For the present illustrative example, the obstacle is a rock, but it is contemplated that the obstacle could be a hill, a ditch or a log or the like. When the track 50 is in an initial position, on a generally flat and level surface, the support structures 100, 102 are in their initial configuration. As the track 50 moves in a forward direction, the track 50 encounters the rock. More precisely, the rock comes into contact with the outer surface 420 of the track system 50.

If the rock is generally laterally centered relative to the track system 50, the endless track 400 begins to deform. If the rock is large enough, the endless track 400 deforms until the inner surface 410 comes into contact with the guide rail 300. Thus, the guide rail 300 can prevent damage to the endless track 400 by limiting how much the endless track 400 can deform.

If the rock is on either side of the track system 50, the rock eventually reaches a position below the leading support wheel assemblies 90a, 90b, and thus causes one of the leading support wheel assemblies 90a, 90b to move in an upward direction. The upward motion of one of the leading support wheel assemblies 90a, 90b causes the axle 112 to pivot about the longitudinal axis 105, which in turn causes the longitudinal member 114 (i.e., the front and rear end portions 116a, 116b) to pivot about the longitudinal axis 105. As a result, the front and rear biasing components 120a, 120b resiliently deform, and bias the support structure 100 to return toward its initial position. Also, in response to axle assembly 110 pivoting, and being that the front and rear end portions 116a, 116b are in contact with the guide rail 300, the guide rail 300 deforms such that distances D1, D2, D3, D4, D5 and D6 remain substantially the same during operation.

Keeping the distances D1 and D2 substantially the same can reduce chances of de-tracking. Keeping the distances D3 and D4 substantially the same can reduce wear on the longitudinal set of lugs 412, 414 as well as wear on the guide rail 300 by preventing the first and second lateral guide rail sides 302, 304 from contacting the inner sides of the longitudinal sets of lugs 412, 414. Keeping the distances D5 and D6 substantially the same can reduce wear on the support wheel assemblies 90 by preventing the outer side of one of the longitudinal set of lugs 412, 414 from contacting the inner side of a corresponding one of the support wheel assemblies 90a, 90b.

Figure 11:
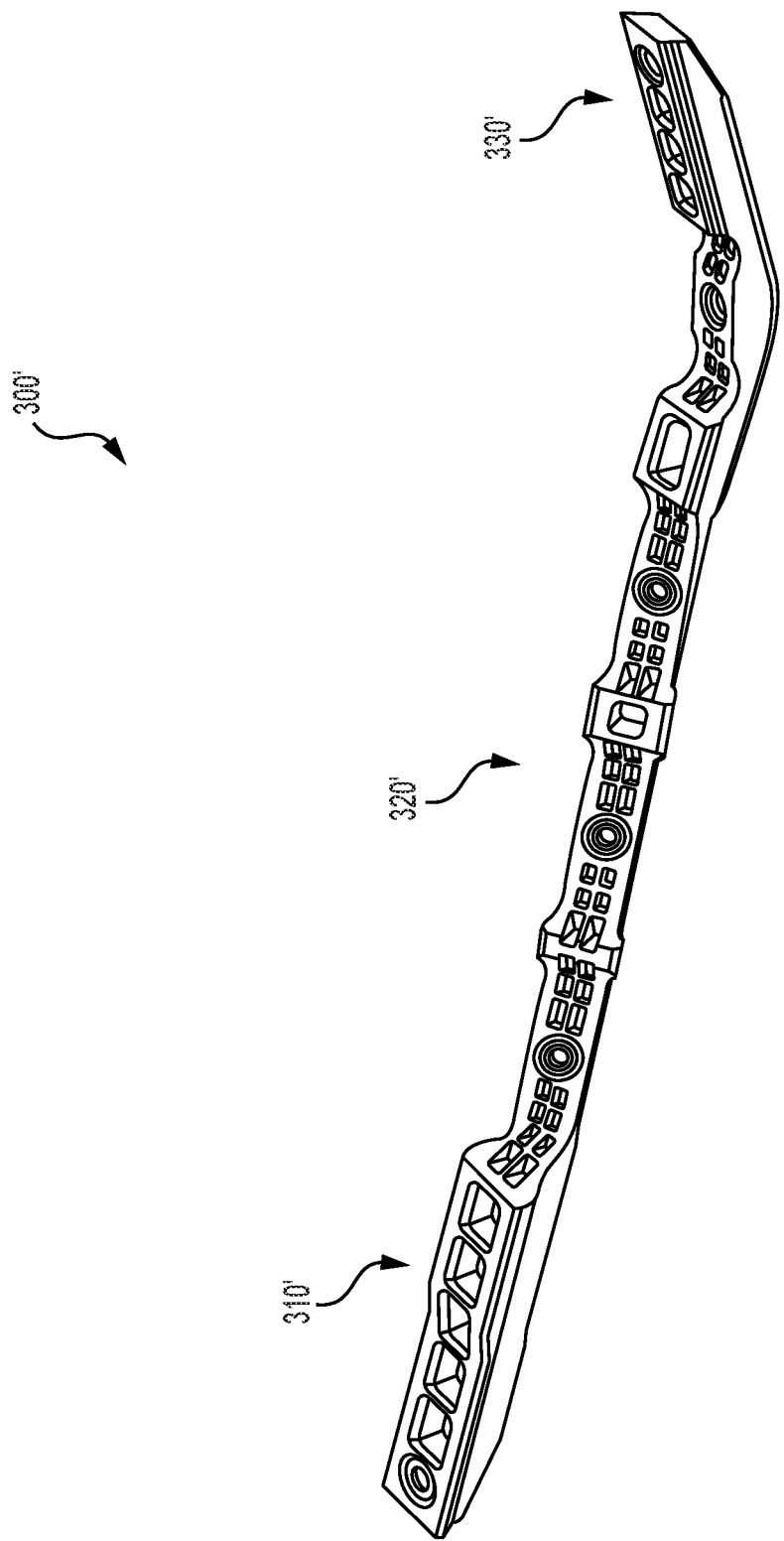
FIG. 11 is a perspective view taken from a top, front, right side of a guide rail according to an alternate embodiment of the present technology, where the guide rail is resiliently deformed.

Referring to FIGS. 10 and 11, another embodiment of the guide rail 300, namely guide rail 300', is shown. The guide rail 300' is similar to the guide rail 300 and thus will not be described in detail herewith. FIG. 10 depicts how the guide rail 300' could deform when support structures according to the present technology pivot to conform to an obstacle. The intermediate portion 320' is resiliently deformed. This deformation is in part enabled by the torsional rigidity of the guide rail 300'. The leading and trailing portions 310', 330' are not deformed, because the obstacle is disposed between them, and because the leading and trailing portions 310', 330' have higher rigidities.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A support structure for connecting support wheel assemblies to a frame of a track system, the track system defining a longitudinal direction, the support structure comprising:
   an axle assembly including:
      an axle; and
      a longitudinal member connected to the axle, the longitudinal member having a first end portion and a second end portion;
   a first biasing component in contact with the first end portion of the longitudinal member;
   a second biasing component in contact with the second end portion of the longitudinal member;
   a first connector connected to the first biasing component and removably connectable to the frame;
   a second connector connected to the second biasing component and removably connectable to the frame;
   the first and second connectors and the first and second biasing components being configured to pivotally connect the axle assembly to the frame; and
   the first and second biasing components biasing the axle assembly toward a first configuration.

2. The support structure of claim 1, wherein the first and second connectors extend laterally relative to the longitudinal member, and are substantially perpendicular to the longitudinal direction.

3. The support structure of claim 1, wherein each one of the first and second connectors is vertically spaced from the axle in the first configuration.

4. The support structure of claim 1, wherein the first biasing component surrounds the first connector and the second biasing component surrounds the second connector.

5. The support structure of claim 1, wherein the axle assembly is pivotable about a longitudinal pivot axis.

6. The support structure of claim 5, wherein the longitudinal pivot axis is vertically spaced from the axle, and when the axle assembly is in the first configuration, the longitudinal pivot axis is below the axle.

7. The support structure of claim 1, wherein the first and second connectors extend vertically relative to the longitudinal member, and are substantially perpendicular to the longitudinal direction.

8. The support structure of claim 7, wherein:
the first biasing components includes:
- a first biasing portion in contact with a first side of the longitudinal member, at the first end portion; and
- a second biasing portion in contact with a second side of the longitudinal member, at the first end portion, and the second biasing component includes:
- a third biasing portion in contact with the first side of the longitudinal member, at the second end portion; and
- a fourth biasing portion in contact with the second side of the longitudinal member, at the second end portion.

9. The support structure of claim 1, wherein the first and second biasing components are made from a resilient material.

10. A track system comprising:
the frame;
a sprocket wheel assembly rotationally connected to the frame;
at least one idler wheel assembly rotationally connected to the frame;
at least one support structure as defined in claim 1 connected to the frame;
at least two support wheel assemblies rotationally connected to the support structure; and
an endless track surrounding the sprocket wheel assembly, the idler wheel assembly, the at least one support structure and the at least two support wheel assemblies.

11. The track system of claim 10, further comprising a guide rail connected to the frame and spaced from the endless track, the guide rail extending in the longitudinal direction.

12. The track system of claim 11, wherein:
the support structure includes a guide rail contacting portion; and
the guide rail has a base surface in contact with the guide rail contacting portion, and in response to the support structure pivoting, the guide rail resiliently deforms to maintain contact with the guide rail contacting portion.

13. The track system of claim 11, wherein the guide rail has a first portion having a first width and a second portion having a second width, wherein the second width is larger than the first width.

14. The track system of claim 11, wherein:
the guide rail has a first lateral guide rail side and second lateral guide rail side; and
a first of the at least two support wheels has a first wheel side and a second wheel side, the first wheel side being adjacent to first lateral guide rail side;
a second of the at least two support wheels has a third wheel side and a fourth wheel side, the third wheel side being adjacent to the second lateral guide rail side,
when the support structure is in a first configuration,
a first distance is measured from the first lateral guide rail side to the first wheel side;
a second distance is measured from the second lateral guide rail side to the third wheel side; and
in response to the support structure pivoting, the guide rail resiliently deforms to maintain the first and second distances substantially the same.

15. The track system of claim 14, wherein when the track system is in a second configuration:
the endless track has:
a first longitudinal set of lugs having a first lug side and a second lug side, the first lug side being adjacent to the first lateral guide rail side and the second lug side being adjacent to the first wheel side;
a second longitudinal set of lugs having a third lug side and a fourth lug side, the third lug side being adjacent to the second lateral guide rail side and the fourth lug side being adjacent to the third wheel side;
when the support structure is in the first configuration,
a third distance is measured from the first lateral guide rail side to the first lug side,
a fourth distance is measured from the second lateral guide rail side to the third lug side,
a fifth distance is measured from the second lug side to the first wheel side;
a sixth distance is measured from the fourth lug side to the third wheel side, and
in response to the axle assembly pivoting, the guide rail resiliently deforms to maintain the third, fourth, fifth and sixth distances substantially the same.

\* \* \* \* \*